United States Patent [19]

Tranchard

[11] Patent Number: 5,648,819
[45] Date of Patent: Jul. 15, 1997

[54] MOTION ESTIMATION USING HALF-PIXEL REFINEMENT OF FRAME AND FIELD VECTORS

[75] Inventor: Lionel Tranchard, Maisons-Alfort, France

[73] Assignee: U.S. Philips Corporation, New York, N.Y.

[21] Appl. No.: 413,061

[22] Filed: Mar. 29, 1995

[30] Foreign Application Priority Data

Mar. 30, 1994 [FR] France ................................ 94 03772
Sep. 21, 1994 [FR] France ................................ 94 11284

[51] Int. Cl.$^6$ .................................................... H04N 7/32
[52] U.S. Cl. ......................................... 348/416; 348/699
[58] Field of Search ................................ 348/413, 416, 348/402, 415, 412, 411, 409, 401, 400, 699, 700, 701, 390, 384; 382/236, 238

[56] References Cited

U.S. PATENT DOCUMENTS 5,369,449  11/1994  Yukitake et al. .................... 348/416
5,550,591  8/1996   Rim et al. ............................ 348/413

FOREIGN PATENT DOCUMENTS 0541389  5/1993  European Pat. Off. .
0598904  6/1994  European Pat. Off. .
9303578  6/1994  Japan .

OTHER PUBLICATIONS

"Displacement Measurement and Its Application in Interframe Image Coding", IEEE Trans. on Communications, vol. COMM-29, No. 12, Dec. 1981, by Jaswant R. Jain and Anil K. Jain.

"Adaptive Frame/Field Motion Compensated Video Coding", Signal Processing: Image COMM. 5 (Feb. 1993) 39–58, by Atul Puri, R. Aravind and Barry Haskell.

*Primary Examiner*—Tommy P. Chin
*Assistant Examiner*—Bryan S Tung
*Attorney, Agent, or Firm*—Laurie E. Gathman

[57] ABSTRACT

Method and corresponding circuit for estimating motion between pictures composed of interlaced fields. Conventionally, such a circuit comprises a channel for searching for the optimum frame vector, which channel is autonomous with respect to that for searching for the optimum field vectors. In accordance with the invention, the channel for searching for the optimum field vectors is unchanged, but for searching for the optimum frame vector the channel comprises two branches which are no longer autonomous but are arranged at the respective output of each sub-stage for searching for the field vector of the channel with a view to determining an approximation of the motion vector which is sufficient for the searched estimation.

7 Claims, 3 Drawing Sheets

MOTION ESTIMATION USING HALF-PIXEL REFINEMENT OF FRAME AND FIELD VECTORS

BACKGROUND OF THE INVENTION

The invention relates to a method of estimating motion between pictures composed of two interlaced fields divided into blocks of pixels, which method comprises a step of searching the motion vector which is most representative of the motion between two pictures, referred to as optimum frame vector, and a step of searching the motion vector which is most representative of the motion between two fields, referred to as optimum field vector, which comprises, in parallel, two sub-steps each comprising, in series, a search for the field vector by way of block matching and a refinement of the search to within half a pixel.

The invention also relates to a circuit for estimating motion between pictures composed of two interlaced fields divided into blocks of pixels, which circuit comprises means for searching the motion vector which is most representative of the motion between two pictures, referred to as optimum frame vector, and means for searching the motion vector which is most representative of the motion between two fields, referred to as optimum field vector, said means for searching the optimum field vector comprising means for searching a field vector by way of block matching and means for refining such a search to within half a pixel.

The invention finally relates to a coding device comprising such a motion estimation circuit.

This invention is widely used in the field of digital data compression before transmission and/or storage of these data, and particularly for realising a device for coding digital television signals which are compatible with the MPEG2 standard.

It is known that the transmission in a digital form of a television picture at the actual definition requires bitrates (and would require even more bitrates at a higher definition) necessitating channels having a very wide band (for example, a sequence of colour pictures of 25 frames per second generates a digital data stream of just over 165 million bits per second). The direct transmission of such a quantity of information cannot be realised economically and, in order that this information can make use of the existing networks for data transmission and storage media, the number of data is compressed. This compression is obtained essentially by utilizing the strong spatial and temporal correlation between neighbouring pixels, as will hereinafter be described in greater detail.

First, it will be useful to recall the main characteristics of the MPEG2 standard. A sequence of digital signals in conformity with this standard comprises information relating to the luminance component Y and the chrominance components, or colour difference signals U and V (the grey levels for the luminance Y and the colour levels for the signals U and V are expressed in digital words of 8 bits). In accordance with the input format provided by the MPEG standard, the chrominance is subjected to a sub-sampling by four with respect to the luminance. There are thus two values which are related to the colour (one for U, the other for V) for four luminance values. As the matrices of words of 8 bits are arranged in blocks of 8×8 pixels, four adjacent blocks of the matrix Y correspond to one block of the matrix U and one block of the matrix V, and these six blocks combined constitute a macroblock (these blocks and macroblocks are the picture subdivision units which are subjected to coding, as in the example cited hereinbefore). Finally, a regrouped series of macroblocks constitutes a slice and each picture is composed of a given number of slices, for example 36 in the example described.

The pictures (the assembly of digital signals corresponding thereto is also concisely referred to as such) are of three types in a stream of MPEG data, dependent on the coding mode applied. The simplest are the pictures I (Intraframe coded pictures) in which all the macroblocks are coded independently of any other picture. If the transmission channel is modified or the bitrate is switched, one should expect such a picture of the type I for reconstituting the new information resulting from said modification at the decoding end. The pictures P (Predictive coded pictures) constitute a second type of pictures which are predicted by unidirectional motion compensation based on a preceding picture (of the type I or of the type P itself) and which thus only contain macroblocks of the type P or of the type I. Finally, the pictures B (Bidirectionally predictive coded pictures) predicted by bidirectional motion compensation based on a previous picture and a subsequent picture (which are themselves of the type I and/or P) may indifferently contain macroblocks of the type I, P or B.

A data stream comprises six information levels (each level including the lower level and some additional information components). The sequence of pictures corresponds to the highest level. This sequence is composed of a succession of groups of pictures (or GOP) each comprising a given number of pictures. A picture such as is shown in FIG. 1 includes a given number n of picture slices $S_1$ to $S_n$, each picture slice includes a given number of macroblocks MB and each macroblock MB comprises a given number r of blocks, here 6 ($Y_1$, $Y_2$, $Y_3$, $Y_4$, U, V) which constitute the last level.

After the description of the MPEG standard features and before the description of the invention, an example of a state-of-the-art coding device will be now described. Such a device, shown in FIG. 2, comprises a coding channel which includes, in series, a discrete cosine transform circuit (DCT), a quantizing circuit 2 and a variable-length coding circuit 3 (VLC). This DCT transform circuit 1 receives, via a subtracter 19 mentioned below, digital signals which correspond to the input video signals of the coding device (obtained, more specifically, by the difference between these input signals and the predicted signals which are present at the other input of the subtracter) and which are available in the form of blocks, here having the format of 8×8 pixels. This circuit 1 converts these signal blocks into blocks of 8×8 coefficients whose first coefficient represents the average value of the grey levels of the pixels of the block considered and whose sixty-three other coefficients represent the different spatial frequencies in this block.

The quantizing circuit 2 quantizes each of these output coefficients of the circuit 1. On the one hand, this quantization is related to the position of the coefficient considered in the 8×8 block (the high spatial frequencies are less perceptible to the human eye and corresponding coefficients may thus be quantized with a quantization step which is larger and gives a less precise quantization) and on the other hand to a quantization factor which is related to the bitrate. The values resulting from this quantization are then applied to the variable-length coding circuit 3, the output of which is connected in a bitrate control stage 15 to a buffer memory 4 for storing the coded words, whose output constitutes that of the coding device. As a function of the fullness of this memory 4, a bitrate control circuit 5 arranged at the output of said memory applies the quantization factor mentioned above to the quantizing circuit 2, and the value of this factor, related to this fullness, provides the possibility of modifying the quantization step in such a way that said memory 4 neither overflows nor underflows. Such a coding chain with bitrate control is known and will not be further described.

The values resulting from the quantization are also applied to a prediction channel including, in series, an inverse quantizing circuit 6 (denoted $Q^{-1}$), an inverse discrete cosine transform circuit 7 (denoted $DCT^{-1}$), an adder 8, a picture memory 9, a circuit 18 for motion estimation and compensation based on the original picture and the non-compensated picture which is stored in said memory, and a subtracter 19 forming the difference between the input signals and the predicted signals which are available at the output of the circuit 18 (these predicted signals are also applied to a second input of the adder 8) so as to apply only the difference between these signals to the coding channel and to treat in this channel only these differences while taking the motion between the predicted picture (based on the preceding picture) and the input picture (or current picture) into account.

The pictures of the type P or B are predicted by estimating the shift(s) within the pictures with respect to the comparison picture(s) by means of motion vectors which are also transmitted in the data stream (most frequently in a differential manner with respect to a motion vector which has already been transmitted). This motion estimation, which is based on the luminance information components, consists of projecting the current block (or macroblock) for which the motion must be evaluated in the comparison image(s) and to compare it (or them) with all the possible blocks (macroblocks) within a search window which limits the maximum possibilities of the motion estimator. The block (macroblock) estimated in the current picture is that of the comparison picture(s) which, in a certain neighbourhood, is the most similar by correlation, the best possible correspondence generally being defined in accordance with a criterion of minimum distortion such as, for example the search to obtain the lowest possible sum of the differences between the luminances of the pixels of the two blocks or macroblocks (the criterion being referred to as MAE—Mean Absolute Error—criterion).

Various documents such as, for example patent application EP-0 560 577 or the article "Adaptive frame/field motion compensated video coding" by A. Puff, R. Aravind and B. Haskell, which appeared in "Signal Processing", vol. 5, nos. 1–2, February 1993, pp. 39–58 published by the European Association for Signal Processing (EURASIP) describe the principles of such a motion estimation and also of motion compensation which is effected at the decoding end on the basis of motion vectors thus defined, and then transmitted and/or stored. As indicated in these documents, the presence of lines from two television picture fields is exploited in the blocks (or macroblocks) under consideration, and the two motion estimation modes are defined: a frame mode and a field mode, which contributes to a realisation of the motion estimation circuit as shown in FIG. 3.

In this Figure, the motion estimation is realised in two channels, a channel 10 for searching the optimum frame vector and a channel 20 for searching the possible optimum field vectors. In each channel the motion estimation is realised in two stages: first, a search of the entire optimum motion vector(s), then a more local search of an improved vector to within half a pixel. Finally, a comparison of the motion vectors thus obtained provides the possibility of selecting one of them as being the most representative of the motion of the current block (macroblock).

More particularly, the channel 10 comprises to this end a stage 100 for searching the frame vector. Such a stage comprises, for example memories which are arranged in series and a block matching correlator. Such a correlator, which is of the conventional type and is described, for example in the document "Displacement measurement and its application in interframe image coding", by J. R. Jain and A. K. Jain, published in "IEEE Transactions on Communications", vol. COM-29, no. 12, December 1981, pp. 1799–1808, has for its object to select a motion vector to which a minimum approximation error corresponds after a search of all the possible vectors in the adopted search range. This block matching search is slightly different as the picture is of the type P or of the type B. If a picture of the type P is used, the estimated block (macroblock) is obtained from another block (macroblock) of the comparison picture, taking into account the motion which is defined by the optimum frame vector. If a picture of the type B is used, the estimated block (macroblock) is the average of the two blocks (macroblocks) obtained in a similar manner from a block (macroblock) of the previous picture and a block (macroblock) of the subsequent picture.

The stage 100 for searching the frame vector is followed by a circuit 130 for refining the search to within half a pixel, for example a symmetrical spatial interpolation filter as indicated in the cited document in "Signal Processing", February 1993. With respect to the position of a pixel resulting from the estimation before refinement, this refinement to within half a pixel takes into account the eight neighbouring positions to within half the pixel surrounding this pixel. If S is the luminance and (x,y) are the horizontal and vertical coordinates of said pixel, we have, for example:

$$S(x+0.5;\ y)=(S(x;\ y)+S(x+1;\ y))/2 \qquad (1)$$

$$S(x;\ y+0.5)=(S(x;\ y)+S(x;\ y+1))/2 \qquad (2)$$

$$S(x+0.5;\ y+0.5)=(S(x;\ y)+S(x+1;\ y)+S(x;\ y+1)+S(x+1;\ y+1))/4 \qquad (3)$$

The reference $\vec{V}_0$ denotes this selected frame vector after refinement of the search, and the nature of the output signal of circuit 130 will hereinafter be indicated.

The channel 20 for searching the possible optimum field vectors comprises a stage 200 for searching field vectors including two sub-stages 210 and 220 for searching the field vector of a structure which is similar to that of the stage 100 (memories and block or macroblock-matching correlator). For this search of the optimum field vectors, two block-matching searches are performed, one for the block (macroblock) comprising the lines of a field having a given parity (i.e. twice fewer lines than in the case of stage 100), and the other for the block (macroblock) comprising the lines of the field of opposite parity. For each field, the reference block (macroblock) may be found either in the even field or in the odd field of the reference frame. As in the case of channel 10, the sub-stages 210 and 220 of the stage 200 are followed by circuits 230 and 240 for refining the search to within half a pixel. These circuits 230 and 240 have a structure which is identical to that of the circuit 130 and the references $\vec{V}_1$ and $\vec{V}_2$ denote the field vectors which can be selected (for the odd and even fields, respectively).

Finally, a decision circuit 250 receiving, in parallel, the three outputs of the circuits 130, 230, 240 for refining the search to within half a pixel, provides the possibility of choosing between frame coding or field coding, for example by comparing in these different cases and in accordance with the same criterion as hereinbefore (criterion of minimum distortion), the sums of the differences between luminances of the pixels of the blocks (macroblocks) concerned and by choosing that vector from the three vectors $\vec{V}_0, \vec{V}_1, \vec{V}_2$ for which this sum is the smallest. In the present case, the signals present at said three outputs of the circuits 130, 230, 240 are thus said sums corresponding to the three vectors $\vec{V}_0, \vec{V}_1, \vec{V}_2$, respectively, and they are indicated in FIG. 3 by the references $S(\vec{V}_0), S(\vec{V}_1), S(\vec{V}_2)$, respectively. Similarly, the outputs of the stage 100 and the sub-stages 210 and 220 are denoted by $S(\vec{U}_0), S(\vec{U}_1), S(\vec{U}_2)$, respectively, in which $\vec{U}_0, \vec{U}_1, \vec{U}_2$ are the frame and field vectors selected before refinement of the search and respectively corresponding to these sums.

In the motion estimation circuit of FIG. 3, the stages 100 and 200 are however the most expensive because of their complexity.

SUMMARY OF THE INVENTION

It is a first object of the invention to provide a motion estimation method which is similar to but simpler than that whose realisation will now be described.

To this end the invention relates to a motion estimation method as defined in the opening paragraph, which is characterized in that said step of searching the optimum frame vector is performed subsequent to said searches for the field vector and successively comprises a sub-step of temporally setting half a frame period based on each field vector obtained by block matching, a sub-step of refining the search to within half a pixel and a sub-step of deciding for the selection of the optimum motion vector in accordance with a given criterion.

The method thus proposed provides the possibility of determining a motion vector representing a satisfactory approximation of that which, for example in the two first documents cited hereinbefore, indicates per picture block the movement between a current picture and a preceding picture of the sequence of pictures to be coded.

In a first embodiment, this method is particularly characterized in that in said step of searching the optimum frame vector the temporal setting sub-step comprises two parallel operations of possible temporal setting of half a frame period, which operations are performed in cascade with said two operations of searching the field vector by way of block matching, the sub-step for refining the search comprises two other operations of refining the search to within half a pixel, which operations are performed in cascade with said two temporal setting operations, and said decision sub-step comprises, in cascade with the four parallel search refinement operations, an operation of selecting the optimum motion vector on the basis of the four results of said search refinement operations.

In an improved variant, this method may be further simplified and it is then characterized in that in said step of searching the optimum frame vector the temporal setting sub-step comprises two parallel operations of possible temporal setting of half a frame period, performed in cascade with said two operations of searching the field vector by way of block matching, the sub-step for refining the search comprises a third operation of refining the search to within half a pixel after said two temporal setting operations, and said decision sub-step comprises a first operation of selecting between two motion vectors, performed in cascade between said two temporal setting operations and said third search refinement operation, and a second operation of selecting between three motion vectors, performed at the output of said three operations of refining the search to within half a pixel.

It is another object of the invention to provide examples of circuits for performing these methods.

To this end, the invention relates to a motion estimation circuit as defined in the opening paragraph, which is characterized in that said means for searching the optimum frame vector are performed subsequent to said means for searching a field vector by way of block matching and comprise means for temporally setting half a frame period based on each field vector obtained by block matching, means for refining the search to within half a pixel and means for deciding for the selection of the optimum motion vector in accordance with a given criterion.

In a variant, the motion estimation circuit, comprising a first channel for searching the optimum frame vector and a second channel for searching the optimum field vector, which channel comprises two parallel branches each comprising, in series, a sub-stage for searching the field vector by way of block matching and a circuit for refining the search to within half a pixel, is characterized in that said first channel comprises two parallel branches having one input connected to the output of one of said sub-stages for searching the field vector and the other to the output of the other sub-stage, said branches each comprising, in series, a circuit for temporally setting half a frame period and a circuit for refining the search to within half a pixel, and in that said first and second channels are followed by a decision circuit arranged to receive, in parallel, the four outputs of said circuits for refining the search to within half a pixel and to supply the output signal corresponding to the optimum motion estimation in accordance with a given criterion.

In an improved variant also provided according to the invention, the motion estimation circuit comprising a first channel for searching the optimum frame vector and a second channel for searching the optimum field vector, which channel comprises two parallel branches each comprising, in series, a sub-stage for searching the field vector by way of block matching and a circuit for refining the search to within half a pixel, is characterized in that said first channel comprises, in parallel, two circuits for possible temporal setting of half a frame period arranged to receive the output of one of said sub-stages for searching the field vector and followed, in series, by a first selection circuit arranged to receive, in parallel, the two outputs of these temporal setting circuits and a circuit for refining the search to within half a pixel, said first and second channels being followed by a second selection circuit arranged to receive, in parallel, the three outputs of said circuits for refining the search to within half a pixel and to supply the output signal corresponding to the optimum motion estimation in accordance with a given criterion.

As has been seen, the invention is widely used in the field of digital data compression. Another object of the invention is to provide, particularly within the scope of such applications, a device for coding digital television signals compatible with the MPEG2 standard.

To this end, the invention relates to a device for coding digital signals which are representative of a sequence of pictures divided into picture blocks each composed of pixels, comprising a first coding channel and a second prediction channel which includes a motion compensation and estimation stage and a subtracter arranged between the input of the coding device and the coding channel and receiving, at its negative input, the output of said motion compensation and estimation stage, said coding device being characterized in that said motion estimation and compensation stage comprises a motion estimation circuit as described hereinbefore.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

These two embodiments realised with connected electronic sub-assemblies will be described first. However, it should be noted that they are only a particular embodiment of the invention and that for example an embodiment including a microprocessor ensuring the performance of series of instructions corresponding to the functions of certain or all stages or circuits in said two embodiments is possible according to the invention. The description of these examples will thus be followed by that of the steps of the method of approximating the motion vector, which method, via these examples, is performed in a general manner within the scope of the invention.

Figure 1:
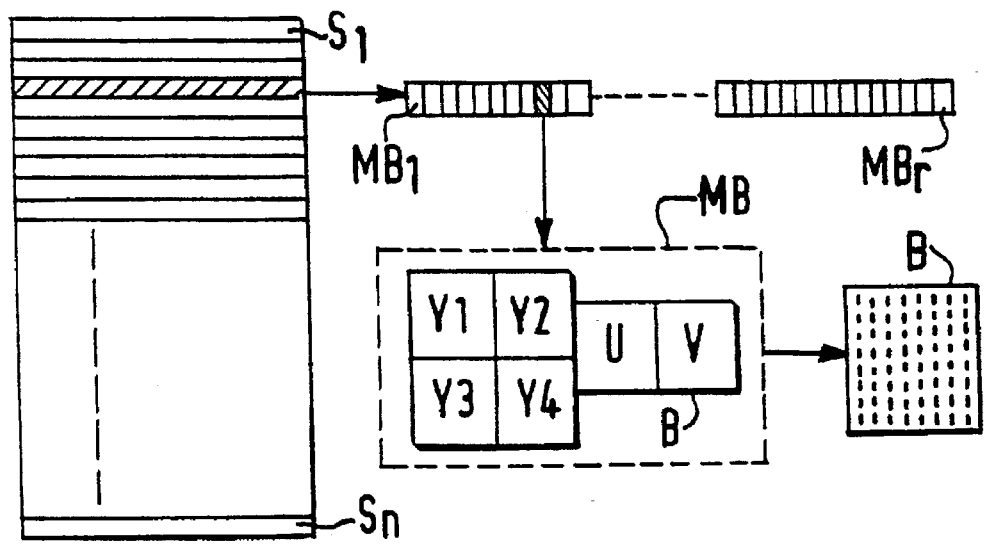
FIG. 1 is a simplified representation of a picture of the MPEG type (left-hand part of the Figure) subdivided into n slices $S_1$ to $S_n$, each of said slices comprising r macroblocks $MB_1$ to $MB_r$ (right-hand part of the Figure) each constituted by four luminance blocks and two chrominance blocks, these blocks comprising 8×8 pixels in this case.
Figure 2:
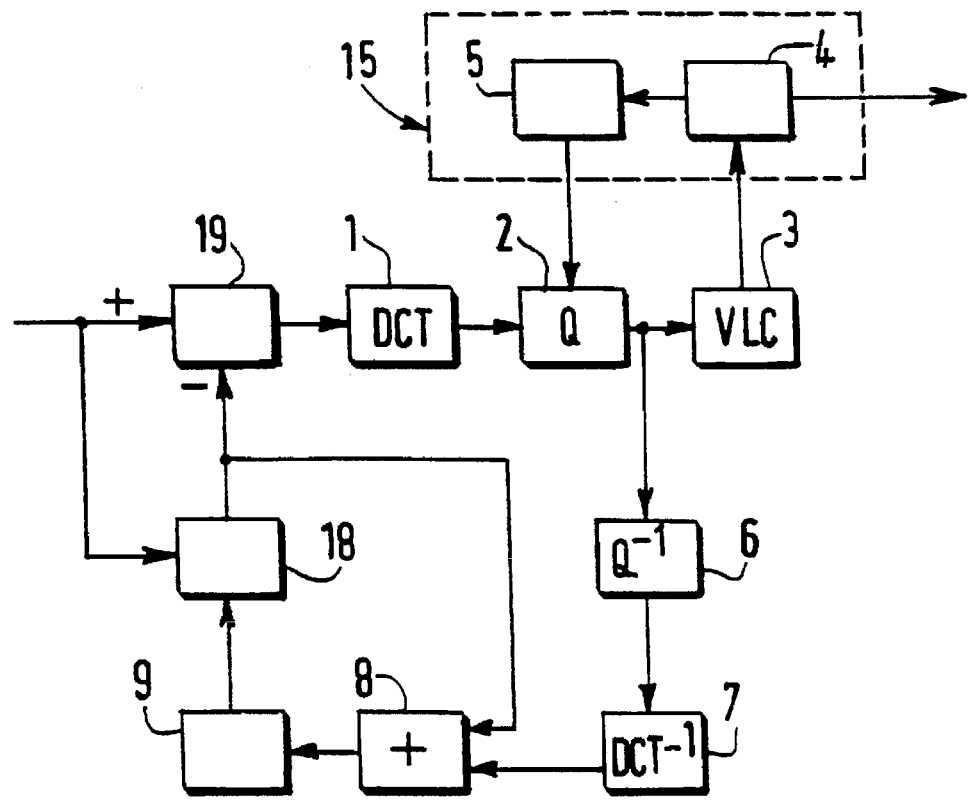
FIG. 2 shows the general structure of a variable-length coding device of the conventional type.
Figure 3:
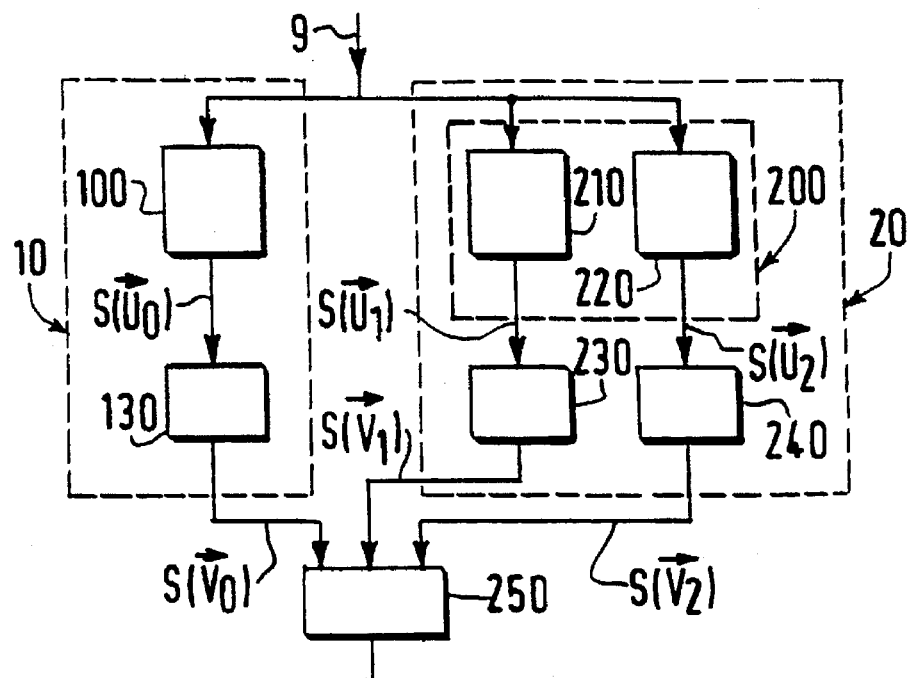
FIG. 3 shows an embodiment in such a coding device of a motion estimation circuit in accordance with the prior art.
Figure 4:
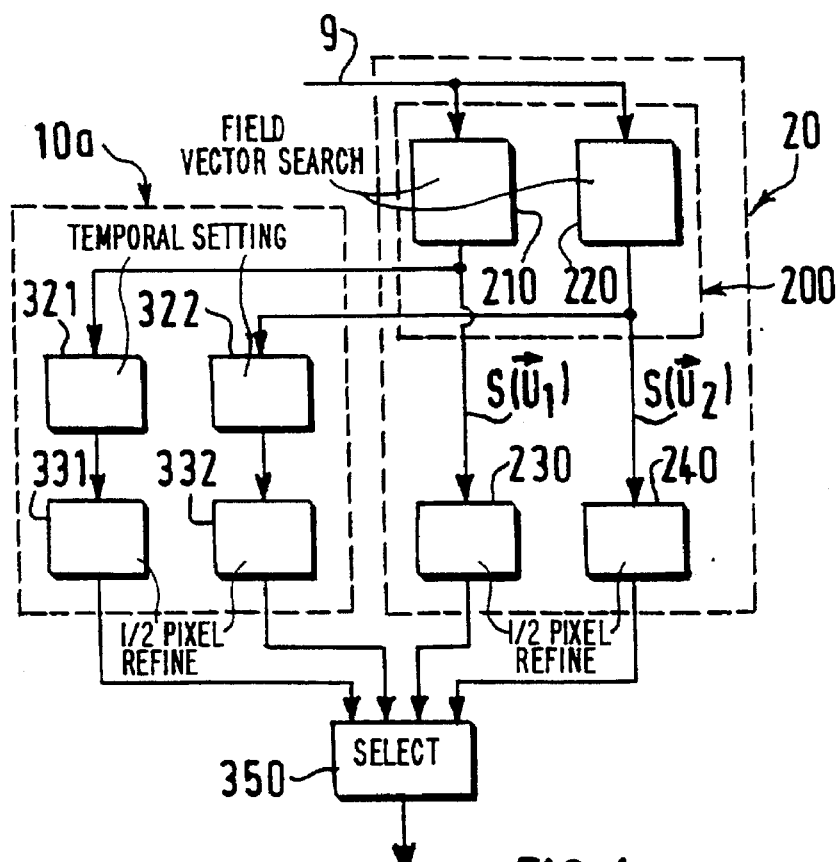
FIGS. 4 and 5 show two embodiments of a motion estimation circuit according to the invention.

This realisation of the embodiment shown in FIG. 4 is ensured by a motion estimation circuit which always comprises, likewise as in the embodiment of FIG. 3, the channel 20 for searching the optimum field vectors, whose structure is the same. In contrast, the channel 10 is replaced by a channel 10a for searching the optimum frame vector, whose structure is as follows. This channel 10a comprises two branches each including, in series, a temporal setting circuit (circuits 321 and 322, respectively) and a circuit for refining the search to within half a pixel (circuits 331 and 332, respectively). In each of these branches, the temporal setting circuit receives the output of one of the sub-stages for searching the field vector.

For example in the first branch, two situations may occur. In the first situation, the optimum field vector selected for the odd field (the vector $\vec{U}_1$) has established conformity between odd fields (i.e. of the same parity) and it is this vector which remains to be selected as being a possible optimum frame vector. In this case, the circuit 321 is inoperative. In the second situation, the optimum field vector $\vec{U}_1$ has in fact established conformity between the odd field of the current frame and the even field of the preceding frame used for motion estimation (this time, the fields have opposite parities). This temporal shift of half a period of the frame should be taken into account, which activates the circuit 321 which, by a rule of three, re-evaluates the optimum field vector $\vec{U}_1$ in the sense of an augmentation when forward prediction is concerned, while the preceding frame is being used for the prediction, or in contrast, will re-evaluate this optimum field vector $\vec{U}_1$ the sense of a diminution when backward prediction is concerned, the prediction this time being made on the basis of the next frame. In the two cases, the output signal $S(\vec{U}_1)$ of the circuit 321, corresponding to the vector $\vec{U}_1$ which is not changed, or is reduced or increased in proportion as the half period of the frame is smaller or larger, is applied to the circuit 331 for refining the search to within half a pixel.

In the second branch comprising the circuits 322 and 332, the process is identical and the same situations may occur. In the first situation, the optimum field vector selected for the even field (the vector $\vec{U}_2$) has established conformity between even fields (i.e. between fields of the same parity) and it is this vector which remains to be selected as the possible optimum frame vector. The circuit 322 is then inoperative. If in the second situation, the optimum field vector $\vec{U}_2$ has established conformity between the even field of the current frame and the odd field of the preceding frame (i.e. between the frames of opposite parity), the temporal shift of half a frame period must also be taken into account, which activates the circuit 322 (which, by a rule of three, re-evaluates the optimum field vector $\vec{U}_2$ in the sense of a diminution when forward prediction is concerned). When backward prediction is concerned, and if there is conformity between the even field of the current frame and the odd field of the preceding frame, the circuit 322 in contrast re-evaluates the optimum field vector $\vec{U}_2$ in the sense of an augmentation. In both cases, the output signal $S(\vec{U}_2)$ of the circuit 322, corresponding to the unchanged, increased or reduced vector $\vec{U}_2$ in proportion as the half period of the frame is smaller or larger, is applied to the circuit 332 for refining the search to within half a pixel.

Finally, the estimation circuit comprises, as hereinbefore, a decision circuit 350, this time receiving in parallel the four outputs of the circuits 331, 332, 230 and 240 for refining the search to within half a pixel. This circuit 350, which has a structure identical to that of the circuit 250, provides the possibility of selecting the output signal which corresponds to the optimum frame vector from the two output signals of the circuits 331 and 332 while using the minimum distortion criterion, and subsequently from this signal and the two output signals of the circuits 230 and 240 the vector which is also optimum, i.e. that for which the sum of the differences between luminances is the smallest per block (macroblock). However, if due to application of a rule of three one of the field vectors gets beyond the search range while taking the temporal shift of half a frame period into account, it is immediately excluded from those for which the selection is realised by the decision circuit 350. In all cases, it is the parity of the vertical component of the motion vector determined for each of the circuits 210 and 220 which determines the activation of the temporal setting circuits or, in contrast, their inactivation.

Figure 5:
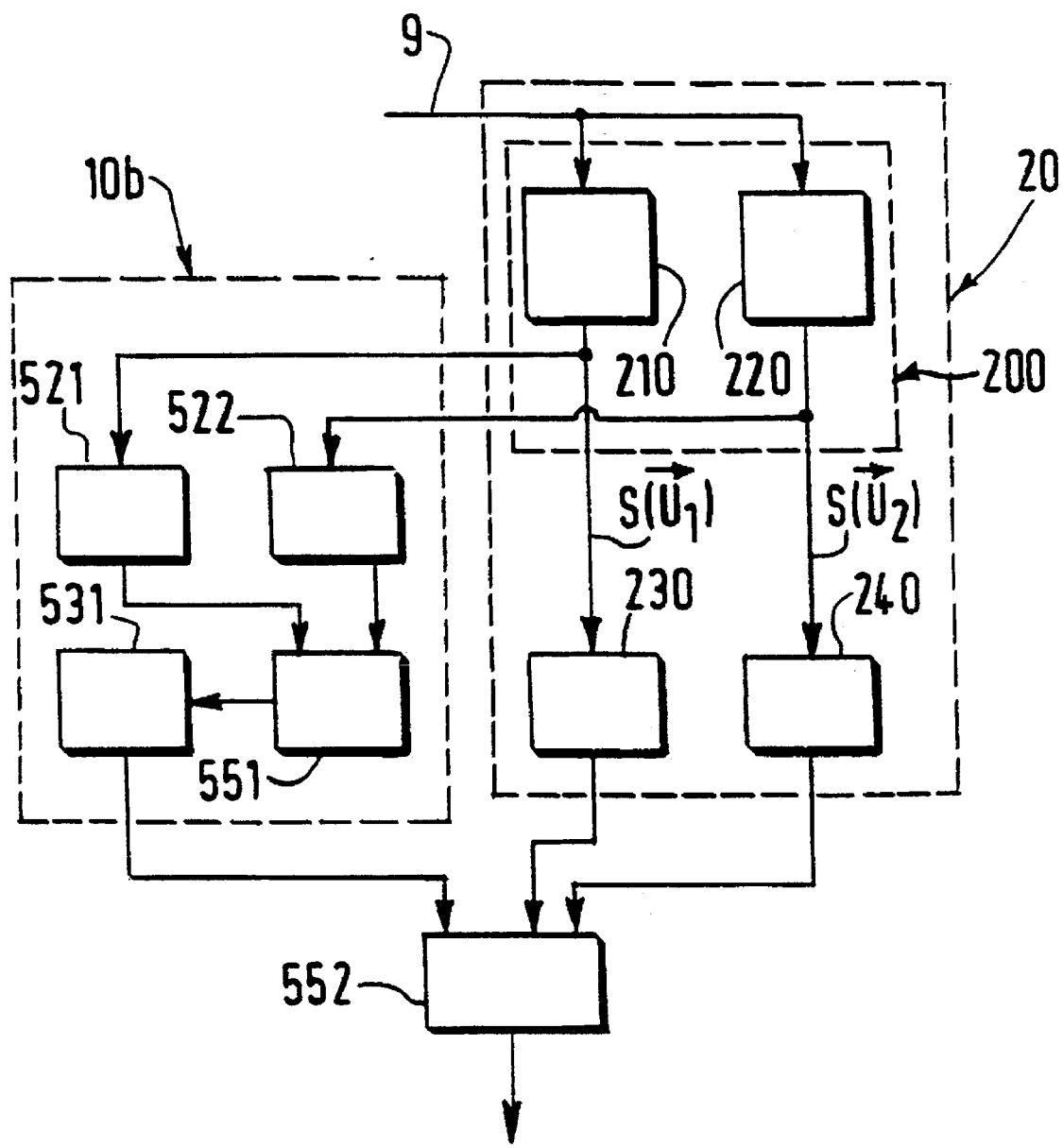

As has been seen, the present invention is not limited to this embodiment. Particularly, another reduction of the cost of the device may be obtained by realising the variant of the embodiment shown in FIG. 5.

The motion estimation circuit proposed in this Figure comprises, likewise as in the embodiments of FIGS. 3 and 4, the channel 20 for searching the optimum field vectors whose structure is unchanged. This time, the channel 10 of FIG. 3 or the channel 10a of FIG. 4 is replaced by a channel 10b for searching the optimum frame vector which has only one branch but is composed in the following manner.

Two temporal setting circuits 521 and 522 are arranged in parallel and receive, likewise as the circuits 321 and 322, the output of one of the sub-stages 210 and 220 for searching the field vector. The situations which may then arise are the same as hereinbefore: according as the optimum field vector $\vec{U}_1$ (and $\vec{U}_2$, respectively) selected for the odd (even) field has established conformity between odd (even) fields or, in contrast, between the odd (even) current field and the even (odd) field of the preceding image, it is this vector $\vec{U}_1$ (or $\vec{U}_2$) which remains to be selected as being a possible optimum frame vector, while the fields have the same parity, and the circuit 521 (or 522) is inoperative in this case, or in contrast the temporal shift of half a frame period due to the fact that the fields have opposite parities must be taken into account, which activates the circuit 521 (or 522). As hereinbefore, this resetting operation consists of a rule of three with which the optimum field vector $\vec{U}_1$ (or $\vec{U}_2$) can be re-evaluated in the sense of an augmentation or a diminution.

In contrast to the previous embodiment, which comprises a single decision circuit, a first selection is immediately made at the output of these circuits 521 and 522 with the aid of a first selection circuit 551 which receives, in parallel, the two output signals from the temporal setting circuits and selects that one of these two signals S(.) which corresponds to the optimum frame vector. This first selection may be made as hereinbefore in accordance with the same minimum distortion criterion. It may also be considered that it is costly to recompute a posteriori the distortions which have already been evaluated in the sub-stages 210 and 220. It is then possible to choose a more approximative criterion (but nevertheless sufficiently efficient) which consists of selecting the output signal $S(U_i)$ corresponding to the vector $U_i$ whose distortion already computed in the sub-stage 210 or 220 has the lowest value. The output of the first selection circuit is applied to a circuit 531 for refining the search to within half a pixel (identical to the foregoing). A second selection circuit 552 receives, in parallel the three outputs of the circuit 531, 230 and 240 and selects that signal which corresponds to the optimum vector in accordance with said criterion which has already been adopted. Here again, any vector beyond the search range, after a possible temporal shift has been taken into account, is excluded from those for which the selection is made.

The embodiments of the motion estimation circuits described hereinbefore and to be applied in the embodiment of a coding device compatible with the MPEG2 standard clearly show the principle of the invention, viz. economizing on some of the most costly steps of the motion estimation method.

It is known that in the state of the art described hereinbefore the estimation of motion between pictures composed of interlaced fields (which pictures are divided into blocks of pixels) comprises two estimations in parallel between which a selection is made for obtaining the optimum motion vector. The first of these estimations consists of a step referred to as searching the motion vector which is most representative of the motion between two frames (or optimum frame vector), and the second estimation consists of a step referred to as searching the motion vector which is most representative of the motion between two fields (or optimum field vector), which step is subdivided into two parallel sub-steps each comprising a first operation of searching the field vector by way of block matching, followed by a second operation of refining this search of the field vector to within half a pixel.

The method according to the invention no longer provides these two estimation steps in parallel, with this method being performed in an autonomous manner, but makes the first step depend on the second step: to this end the step of searching the optimum frame vector is performed subsequent to the operations of searching the field vector and comprises, in cascade, sub-steps for temporally setting half a frame period based on each optimum field vector after block matching, refining the search to within half a pixel and deciding for a selection of the optimum motion vector in accordance with a given criterion. In the circuit for implementing said method, which comprises means for searching on the one side the optimum frame vector and on the other side the optimum field vector (for the latter, by way of block matching and refining to within half a pixel), it is then provided that said means for searching the optimum frame vector are performed subsequent to said means for searching a field vector by way of block matching and comprise means for temporally setting half a frame period based on each field vector obtained by block matching, means for refining the search to within half a pixel and means for deciding for the selection of the optimum motion vector in accordance with a given criterion. This modified method leads to a motion vector which is now only an approximation with respect to a vector obtained in accordance with the parallel method, but the tests which have been realised show that this approximation remains quite satisfactory.

In the thus modified step of searching the optimum frame vector, the temporal setting sub-steps which consist of two parallel operations of possible temporal setting of half a frame period, performed out in cascade with said two operations of searching the field vector by way of block matching are then followed by sub-steps which may be implemented in a different manner, for example:

(a) either the sub-step for refining the search comprises two other operations of refining the search to within half a pixel, performed in cascade with the two temporal setting operations, and the decision sub-step then comprises, in cascade with the four search-refining operations thus defined, a single operation of selecting the optimum motion vector from the four results of said search refining operations;

(b) or the search refining sub-step only comprises a third operation of refining the search to within half a pixel after said two temporal setting operations, and the decision sub-step then comprises a first operation of selection between two motion vectors, performed in cascade with said two temporal setting operations and said third search refining operation, and a second operation of selecting between three motion vectors, performed at the output of the three operations for refining the search to within half a pixel.

In the first case, the simplification of the method is already notable because an autonomous estimation step, the step performed by the stage 100 in the known example shown in FIG. 3, is omitted with respect to the previous implementations. In the second case, the simplification is even more complete because an operation of refining the search of the motion vector to within half a pixel can also be omitted. In both cases, the method is also suitable for the implementations described with respect to FIGS. 4 and 5 as well as to an implementation which is partly or totally in the form of the execution of a series of programmed instructions which, as stated hereinbefore, are controlled by a microprocessor or a computer.

I claim:

1. A method of estimating motion between pictures composed of two interlaced fields divided into blocks of pixels, which method comprises a step of searching for a motion vector which is most representative of the motion between two pictures, referred to as an optimum frame vector, and a step of searching for a motion vector which is most representative of the motion between two fields, referred to as an optimum field vector, the step of searching for the optimum field vector comprising, in parallel, two sub-steps each comprising, in series, a search for the field vector by way of block matching and a refinement of the field vector search to within half a pixel, the method characterized in that the step of searching for the optimum frame vector is performed subsequent to the parallel searches for the field vector and successively comprises a sub-step of temporally setting half a frame period based on each field vector obtained by clock matching, a sub-step of refining the frame vector search to within half a pixel and sub-step of selecting an overall optimum motion vector in accordance with a given criterion.

2. A method of estimating motion as claimed in claim 1, characterized in that in the step of searching for the optimum frame vector the temporal setting sub-step comprises two parallel operations of possible temporal setting of half a frame period, performed in cascade with the two sub-steps of searching for the field vector by way of block matching, the sub-step for refining the frame vector search comprises two other operations of refining the frame vector search to within half a pixel, which refining operations are performed in cascade with said possible two temporal setting operations, and said selecting sub-step comprises, in cascade with the two field vector search refinement operations and the two frame vector search refinement operations, an operation of selecting the overall optimum motion vector on the basis of the respective results of the field vector and frame vector search refinement operations.

3. A method of estimating motion as claimed in claim 1, characterized in that in the step of searching for the optimum frame vector the temporal setting sub-step comprises two parallel operations of possible temporal setting of half a frame period, performed in cascade with the two sub-steps of searching for the field vector by way of block matching, the sub-step of refining the frame vector search comprises a third operation of refining the frame vector search to within half a pixel after said possible two temporal setting operations, and said selecting sub-step comprises a first operation of selecting between two motion vectors, performed in cascade between said possible two temporal setting operations and the third search refinement operation, and a second operation of selecting between three motion vectors, performed at the output of the two field vector search operations of refining the field vector search to within half a pixel and at the output of the third search refinement operation.

4. A circuit for estimating motion between pictures composed of two interlaced fields divided into blocks of pixels, which circuit comprises means for searching for a motion vector which is most representative of the motion between two pictures, referred to as an optimum frame vector, and means for searching for a motion vector which is most representative of the motion between two fields, referred to as an optimum field vector, the means for searching for the optimum field vector comprising means for searching a field vector by way of block matching and means for refining the field vector search to within half a pixel, characterized in that the means for searching for the optimum frame vector are utilized subsequent to the utilization of the means for searching for a field vector by way of block matching and comprise means for temporally setting half a frame period based on each field vector obtained by block matching, means for refining the frame vector search to within half a pixel and means for selecting an overall optimum motion vector in accordance with a given criterion.

5. A circuit for estimating motion as claimed in claim 4, comprising a first channel for searching the optimum frame vector and a second channel for searching the optimum field vector, the second channel comprising two parallel branches each comprising, in series, a sub-stage for searching the field vector by way of block matching and a circuit for refining the field vector search to within half a pixel, characterized in that said first channel comprises two parallel branches having one input connected to the output of one of the sub-stages for searching the field vector and the other input connected to the output of the other sub-stage, said branches of the first channel each comprising, in series, a circuit for temporally setting half a frame period and a circuit for refining the frame vector search to within half a pixel, and in that said first and second channels are followed by a decision circuit arranged to receive, in parallel, the two outputs of the circuits for refining the frame vector search to within half a pixel and the two outputs of the circuits for refining the field vector search to within half a pixel and to supply an output signal corresponding to an optimum motion estimation in accordance with a given criterion.

6. A circuit for estimating motion as claimed in claim 4, comprising a first channel for searching the optimum frame vector and a second channel for searching the optimum field vector, the second channel comprising two parallel branches each comprising, in series, a sub-stage for searching the field vector by way of block matching and a circuit for refining the field vector search to within half a pixel, characterized in that said first channel comprises, in parallel, two circuits for possible temporal setting of half a frame period arranged to receive the respective outputs of said sub-stages for searching the field vector and followed, in series, by a first selection circuit arranged to receive, in parallel, the two outputs of said possible temporal setting circuits and a circuit for refining the frame vector search to within half a pixel, said first and second channels being followed by a second selection circuit arranged to receive, in parallel, the two outputs of the circuits for refining the field vector search to within half a pixel and the output of the circuit for refining the frame vector search to within half a pixel, and to supply an output signal corresponding to an optimum motion estimation in accordance with a given criterion.

7. A device for coding digital signals which are representative of a sequence of pictures divided into picture blocks each composed of pixels, comprising a first coding channel and a second prediction channel which includes a motion estimation and compensation stage and a subtracter arranged between the input of the coding device and the coding channel and receiving, at its negative input, the output of said motion estimation and compensation stage, said coding device being characterized in that said motion estimation and compensation stage comprises a motion estimation circuit as claimed in claim 4.

* * * * *